(12) United States Patent
Belaso (10) Patent No.: US 8,555,568 B2
(45) Date of Patent: Oct. 15, 2013

(54) DRAIN INLET VAULT AND METHOD OF ASSEMBLY

(75) Inventor: David Belaso, Westminster, CA (US)

(73) Assignee: Stormwater Filters, Corp., Westminster, CA (US)

( * ) Notice: Subject to any disclaimer, the term of this patent is extended or adjusted under 35 U.S.C. 154(b) by 1018 days.

(21) Appl. No.: 12/485,690

(22) Filed: Jun. 16, 2009

(65) Prior Publication Data

US 2010/0006487 A1     Jan. 14, 2010

Related U.S. Application Data

(60) Provisional application No. 61/132,209, filed on Jun. 17, 2008.

(51) Int. Cl.
    *H05K 5/00*     (2006.01)

(52) U.S. Cl.
    USPC ............. 52/169.7; 52/79.5; 52/79.1; 52/79.2

(58) Field of Classification Search
    USPC ............................ 52/169.7, 79.5, 79.1, 79.2
    See application file for complete search history.

(56) References Cited

U.S. PATENT DOCUMENTS

| | | | | |
|---|---|---|---|---|
| 952,985 | A * | 3/1910 | Ernsberger | 52/136 |
| 4,021,979 | A * | 5/1977 | Rez | 52/127.1 |
| 4,942,702 | A * | 7/1990 | Lemasson | 52/127.7 |
| 5,960,524 | A * | 10/1999 | Darby et al. | 27/35 |
| 6,202,370 | B1 * | 3/2001 | Miller et al. | 52/169.14 |
| 6,493,911 | B1 * | 12/2002 | Troin et al. | 27/1 |
| 6,606,836 | B2 * | 8/2003 | Miller | 52/741.14 |
| 6,705,049 | B2 | 3/2004 | Esmond et al. | |
| 6,901,640 | B2 * | 6/2005 | Sevey | 27/35 |
| 6,911,076 | B2 | 6/2005 | Keshmiri | |
| 6,953,529 | B2 | 10/2005 | Weir | |
| 6,976,345 | B2 | 12/2005 | Keshmiri | |
| 7,258,785 | B2 | 8/2007 | Weir et al. | |
| 7,300,590 | B2 | 11/2007 | Weir et al. | |
| 7,475,515 | B2 * | 1/2009 | Machledt et al. | 52/169.7 |
| 2002/0011035 | A1 * | 1/2002 | Boyer et al. | 52/79.5 |
| 2002/0148194 | A1 * | 10/2002 | Miller | 52/741.4 |
| 2005/0000175 | A1 * | 1/2005 | Machledt et al. | 52/220.1 |
| 2005/0230317 | A1 * | 10/2005 | Belasco et al. | 210/691 |
| 2007/0033887 | A1 * | 2/2007 | Ambrose | 52/171.3 |

* cited by examiner

Primary Examiner — William Gilbert
Assistant Examiner — Alp Akbasli
(74) Attorney, Agent, or Firm — John J. Connors; Connors & Assoc. pc (57) ABSTRACT

A drain inlet vault comprises a plurality of pre-cast concrete vault sections stacked one upon the other to form the vault. Each vault section has essentially the same cross-sectional configuration and at least one perimeter edge that upon stacking the vault sections one on top of the other the perimeter edges of adjacent vault sections engage. A sealant material along the perimeter edges forms a seal as the weight of an upper section bears against a lower section. At least one support element for water treatment equipment, or a component thereof, is mounted between the perimeter edges, and this support element has a portion extending into an interior of the vault for holding the water treatment equipment, or component thereof.

8 Claims, 10 Drawing Sheets

DRAIN INLET VAULT AND METHOD OF ASSEMBLY

RELATED PATENT APPLICATIONS & INCORPORATION BY REFERENCE

This application claims the benefit under 35 USC 119(e) of U.S. Provisional Patent Application No. 61/132,209, entitled "Storm Water Filter Support Device & Method," filed Jun. 17, 2008. This related provisional application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

The words "substantially" and "essentially" have equivalent meanings.

BACKGROUND

Filtration equipment and devices are commonly referred to as "storm water filters", "storm water inserts", "drain inlet inserts" or "catch basin inserts" now find increasing use as a Best Management Practice (BMP) to meet environmental regulations. Such devices and other water treatment equipment are commonly installed in site-built or pre-cast concrete catch basins, commonly referred to as drain inlet vaults, either by suspending the equipment, or component thereof, from a grating or cover support frame surrounding an open top of the drain inlet vault, or by attaching an appropriate metal framework to interior wall surfaces of the vault to provide support for the equipment or components to be deployed within the vault interior space.

A significant percentage of such concrete drain inlet vaults are delivered to construction sites as large, pre-cast structures weighing greatly in excess of 2500 pounds and set into a prepared excavation for connection of inlet/outlet piping and eventual installation of storm water filtration equipment. Because of relatively low interior volume, one difficult task associated with installing water treatment equipment is proper installation of any necessary support structure to interior walls of the vault.

If a vault to be used for a particular water treatment application was available as a configuration that included the necessary support structure, without interfering with subsequent tasks, installation of the equipment would be greatly simplified and might easily become a task for less-skilled trades already performing other tasks on-site, thereby reducing construction costs.

SUMMARY

My vault and method of assembly has one or more of the features depicted in the embodiments discussed in the section entitled "DETAILED DESCRIPTION OF SOME ILLUSTRATIVE EMBODIMENTS." The claims that follow define my vault and method of assembly, distinguishing them from the prior art; however, without limiting the scope of my vault and method of assembly as expressed by these claims, in general terms, some, but not necessarily all, of their features are:

One, my drain inlet vault comprises a plurality of vault sections stacked together in substantial registration to form the vault. Two or more sections are employed and may include a base section and a cap section, but, as needed to achieve appropriate overall finished vault depth, one or more additional riser sections may be included. A sealant is between adjacent stacked together vault sections, and there is at least one support element for water treatment equipment, or a component thereof, positioned between at least one pair of adjacent stacked together vault sections. The sealant is placed between perimeter edges of adjacent stacked together vault sections prior to placing one section upon the other section. A seal forms upon the weight of an upper section bearing down on an immediate lower section. Injection or placement of sealant prevents water leakage at the abutting edges post-installation.

Two, the sections may be pre-cast concrete delivered to the construction site where they are assembled. Each individual section's weight does not exceed approximately 2500 pounds. This lightweight enables shipment of un-assembled, pre-cast vault sections along with other elements of my vault such as the sealant material and support elements for the equipment. Consequently, my vault becomes economically feasible even when the construction site where assembly occurs is far from the manufacturing facility making the vault sections. In other words, the lightweight vault sections may be shipped over long distances within or between states at reasonable transportation charges. Moreover, because they are relatively light, this allows loading, unloading and placement of such sections in excavations using manual labor or the lower-load-capacity equipment common to construction sites. Although the vault sections are lightweight, they and my assembled vault have sufficient strength to meet vehicle load rating criteria such as AASHTO H-20.

Three, each vault section has a predetermined configuration to enable stacking one vault section upon another in concentric alignment along a longitudinal centerline of the vault. For example, the sections may have several different cross-sectional shapes such as circular, rectangular, hexagonal, octagonal, etc. Each vault section also has at least one perimeter edge that, upon stacking the vault sections, the edges of adjacent vault sections abut each other. The perimeter edges may be mating edges comprising, for example, a male member along one adjacent vault section perimeter edge and a female member along other adjacent vault section perimeter edge. A tongue-in-groove arrangement is one embodiment. The mating edges have interlocking shapes such as a tongue-in-groove insuring that the next upper vault section is in alignment with the immediate lower vault section.

Four, a prefabricated support element adapted to hold water treatment equipment, or a component thereof, is installed at the site during assembly of the sections between perimeter edges of adjacent vault sections. The support element has enlarged central opening and may be configured as a frame. It is positioned on a perimeter edge of a lower vault section and securely and permanently held in position by lowering the next vault section into place on top on the support element, forming a joint between the adjacent vault sections. An edge of the support element is captured between abutting perimeter edges, relying on the mass of the vault sections installed above any support element to insure that the installation of the support element is for the vault life. The perimeter edges engage to form a narrow gap inward of the seal. This gap has an open mouth along an interior wall surface enclosing the interior of the vault. A portion of the support element has a thin planar outer edge that fits into the open mouth snug within the gap and an inner planar edge that extends slightly outward from the interior wall surface a short distance, for example, substantially from 0.375 to 1.5 inch. This inner edge defines the area of the opening and provides a ledge upon which the water treatment equipment, or a component thereof, rests. The enlarged central opening for each support element within the vault provides access to any components that are below it in the vault. The support element may be made of a material that resists corrosion such as, for example, stainless steel.

Five, the depth of individual vault sections may be such that joints may be located at specific elevation(s) most useful for positioning the support element to enable the water treatment equipment, or a component thereof, to be properly located within a particular vault interior, while still allowing installation and/or removal of equipment below each such support structure, plus access for periodic visual inspection and physical cleanout. Because my vaults may be constructed of lightweight raw materials, such as lightweight aggregates, foamed concrete, etc., individual vault sections are strong enough to meet required vehicle loading criteria while still being light enough in weight to enable loading, unloading and placement of such sections in excavations using lower-load-capacity equipment common to construction sites. Moreover, palletized shipment over long distances within or between states of my pre-cast vault sections along with the support element(s) now becomes economically feasible.

In my method a drain inlet vault is assembled on site from a plurality of lightweight, complementary, interlocking vault sections. According to my method a hole at the site is excavated and individual vault sections are placed in the hole one on top of the other in vertical alignment. These sections each include at least one perimeter edge so that, upon stacking of the vault sections, the perimeter edges of adjacent vault sections abut each other. A sealant and a support element for the equipment are positioned between stacked together vault sections. The support element has an outer portion extending into an interior of the vault that is sufficiently rigid to hold the water treatment equipment, or a component thereof. The sealant and support element are positioned between the adjacent vault sections prior to placing the upper section on the lower section, with the weight of the upper section compressing the sealant and holding the support element firmly between the stacked together sections. My method enables positioning of storm water filters, and other sub-assemblies of water treatment equipment, in more complex storm water or some industrial waste water treatment systems while, at the same time, simplifying and reducing the cost of their installation in vaults used for such water treatment purposes.

These features are not listed in any rank order nor is this list intended to be exhaustive.

DESCRIPTION OF THE DRAWING

Some embodiments of my vault and method of assembly are discussed in detail in connection with the accompanying drawing, which is for illustrative purposes only. This drawing includes the following figures (FIGS.), with like numerals indicating like parts.

DETAILED DESCRIPTION OF SOME ILLUSTRATIVE EMBODIMENTS

General

Figure 2:
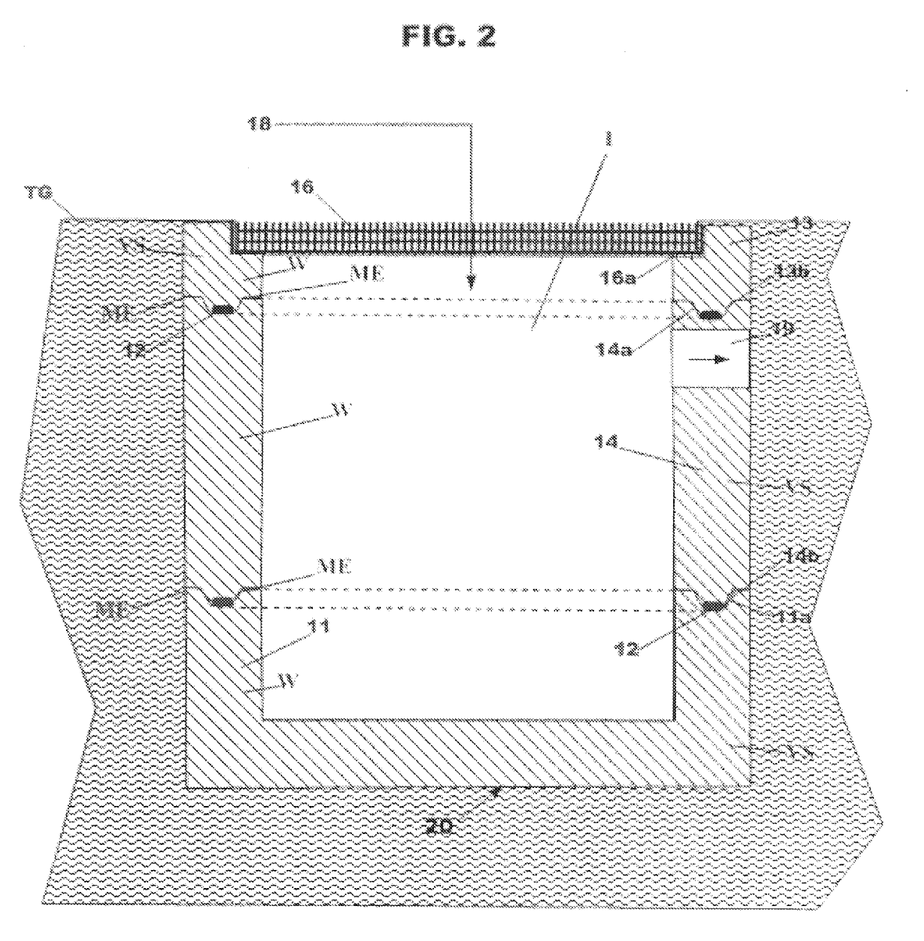
FIG. 2 is a cross-sectional view of one embodiment of my drain inlet vault assembled and installed in a hole in the ground using three separately constructed pre-cast vault sections.
Figure 3:
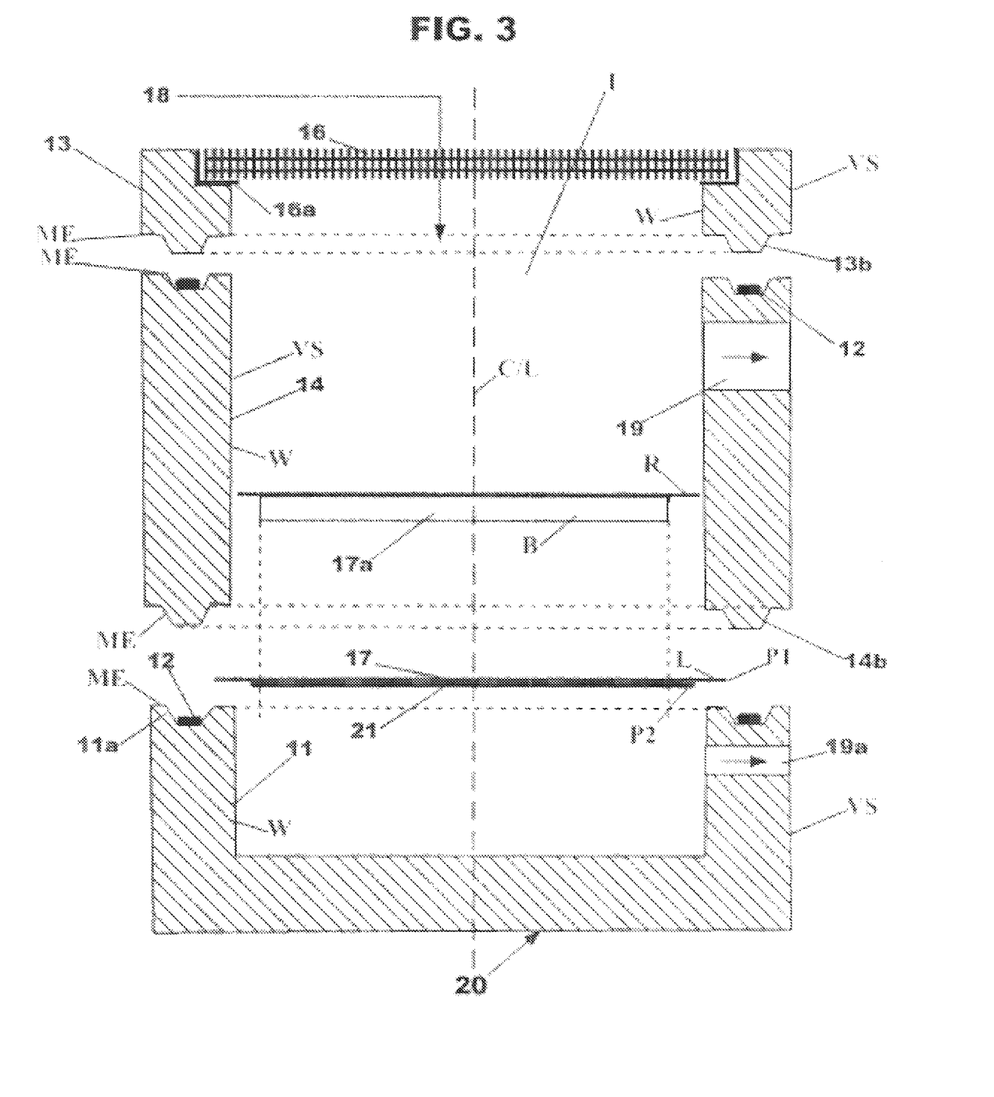
FIG. 3 is an exploded cross-sectional view of my vault illustrated in FIG. 2.
Figure 4:
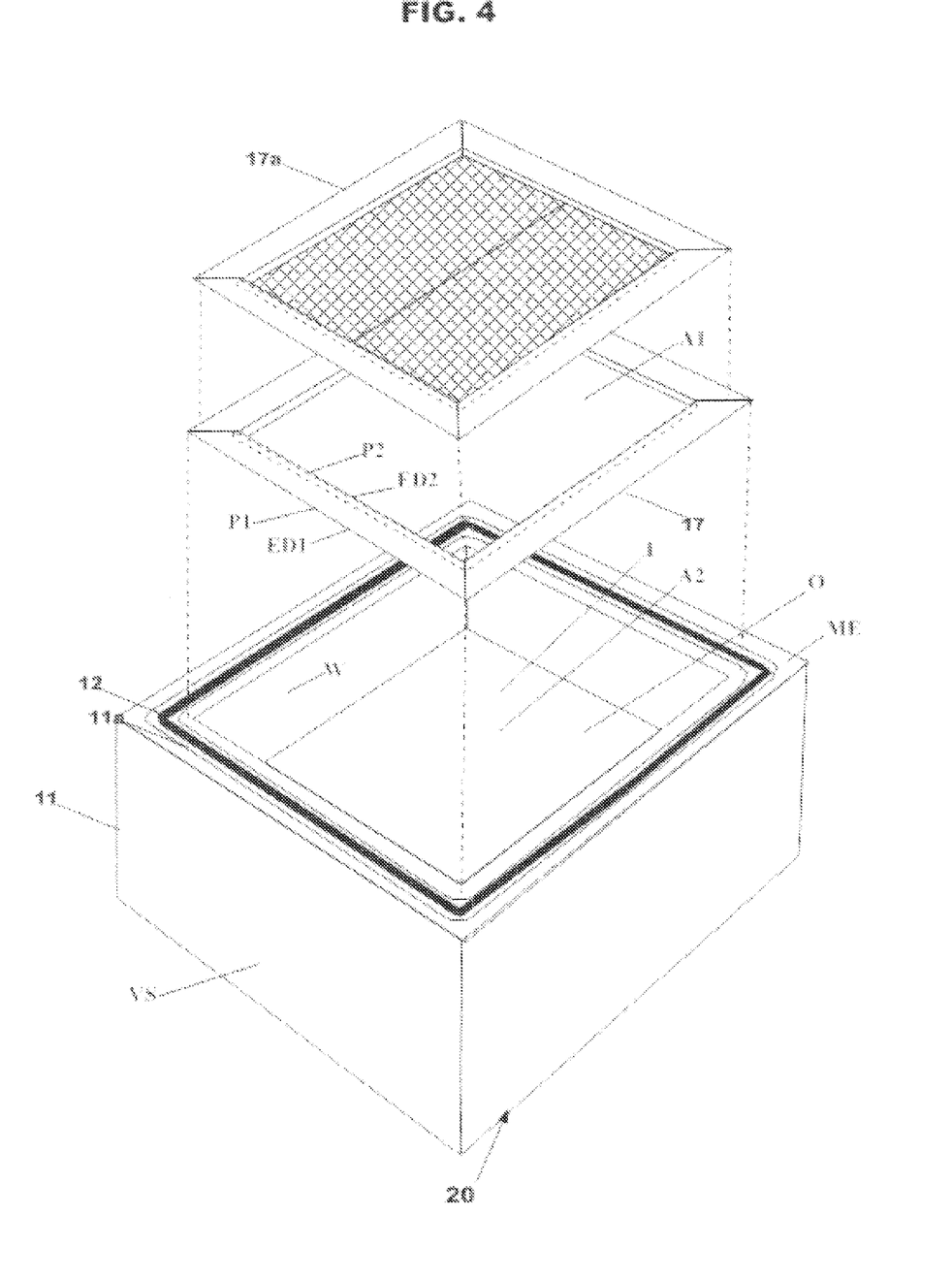
FIG. 4 is an exploded perspective view of the base section of my vault depicted in FIG. 3.
Figure 4A:
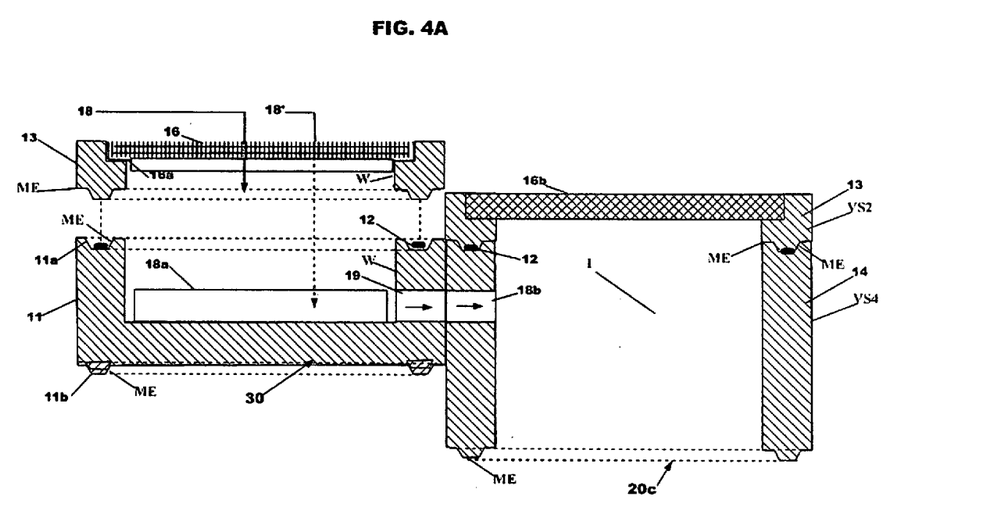
FIG. 4A is a cross-sectional view of an alternate embodiment of my vault using a receiver section having a groove in an upper perimeter edge and a tongue in a lower perimeter edge, and a rectangular inlet port.
Figure 4B:
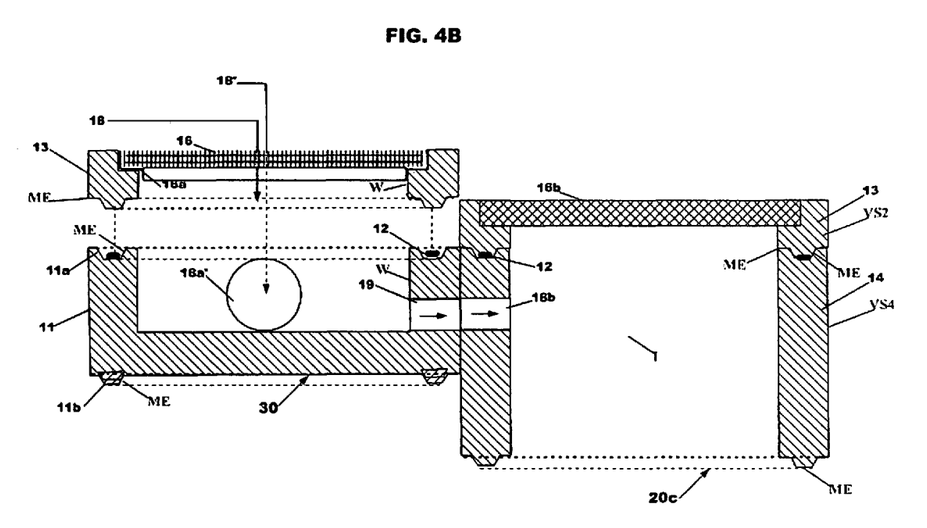
FIG. 4B is a cross-sectional view of another alternate embodiment of my vault using a receiver section having a groove in an upper perimeter edge and a tongue in a lower perimeter edge, and a round inlet port.
Figure 5:
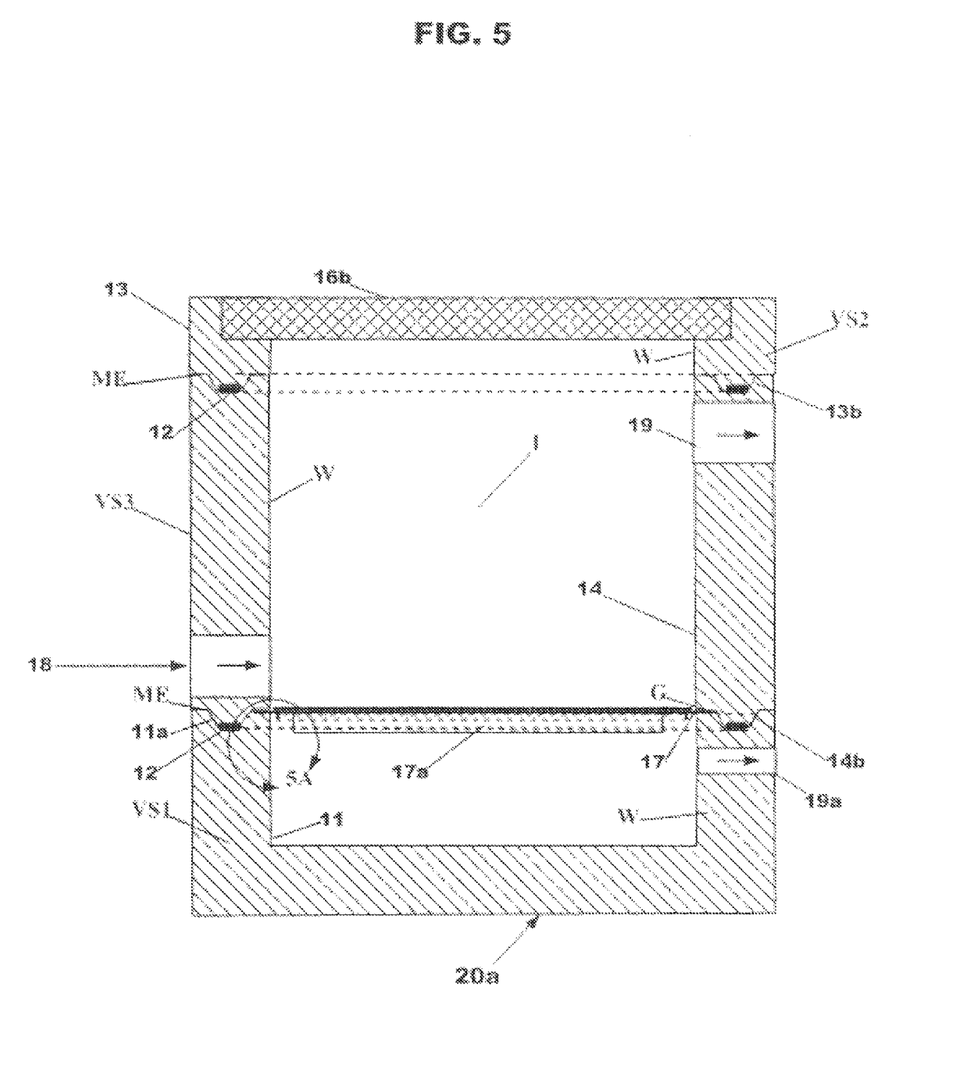
FIG. 5 is a cross-sectional view of another embodiment of my vault in which the open top entry pathway has been replaced with a solid cover, and instead, storm water enters the vault by way of a sidewall port.
Figure 5A:
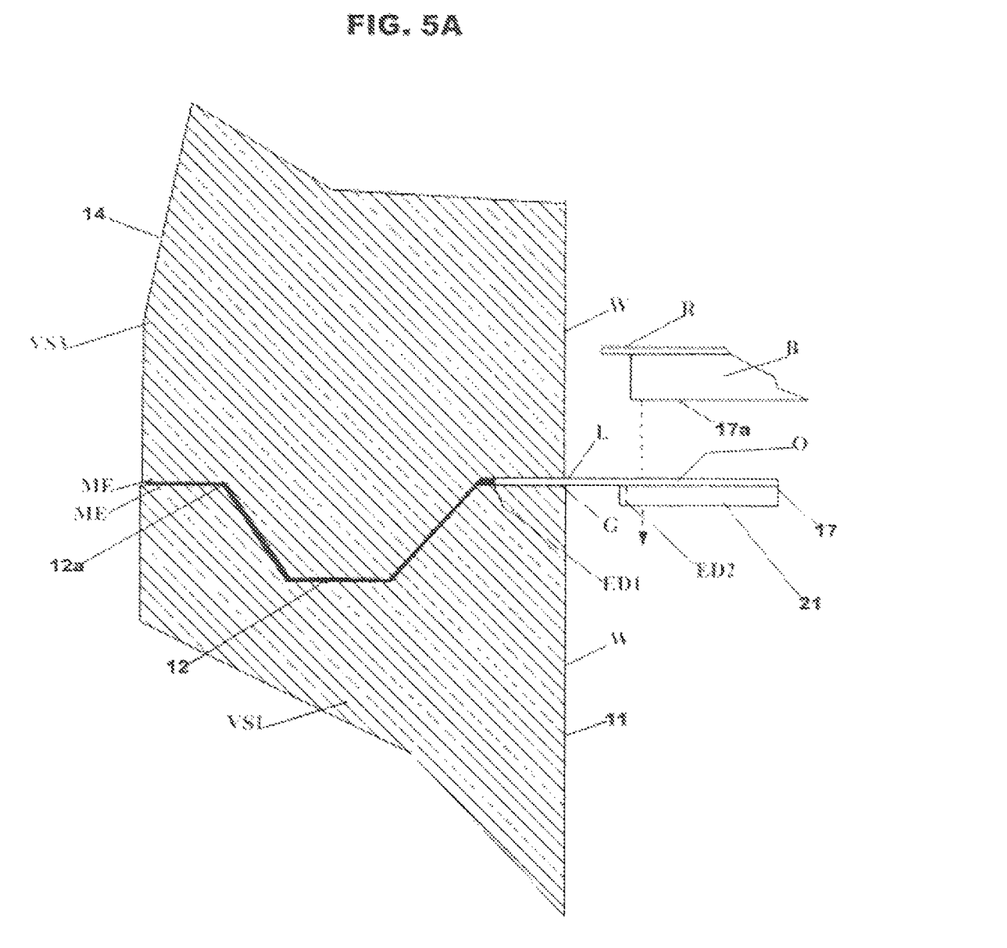
FIG. 5A is an enlarged cross-sectional view taken along the line 5A of FIG. 5.
Figure 6:
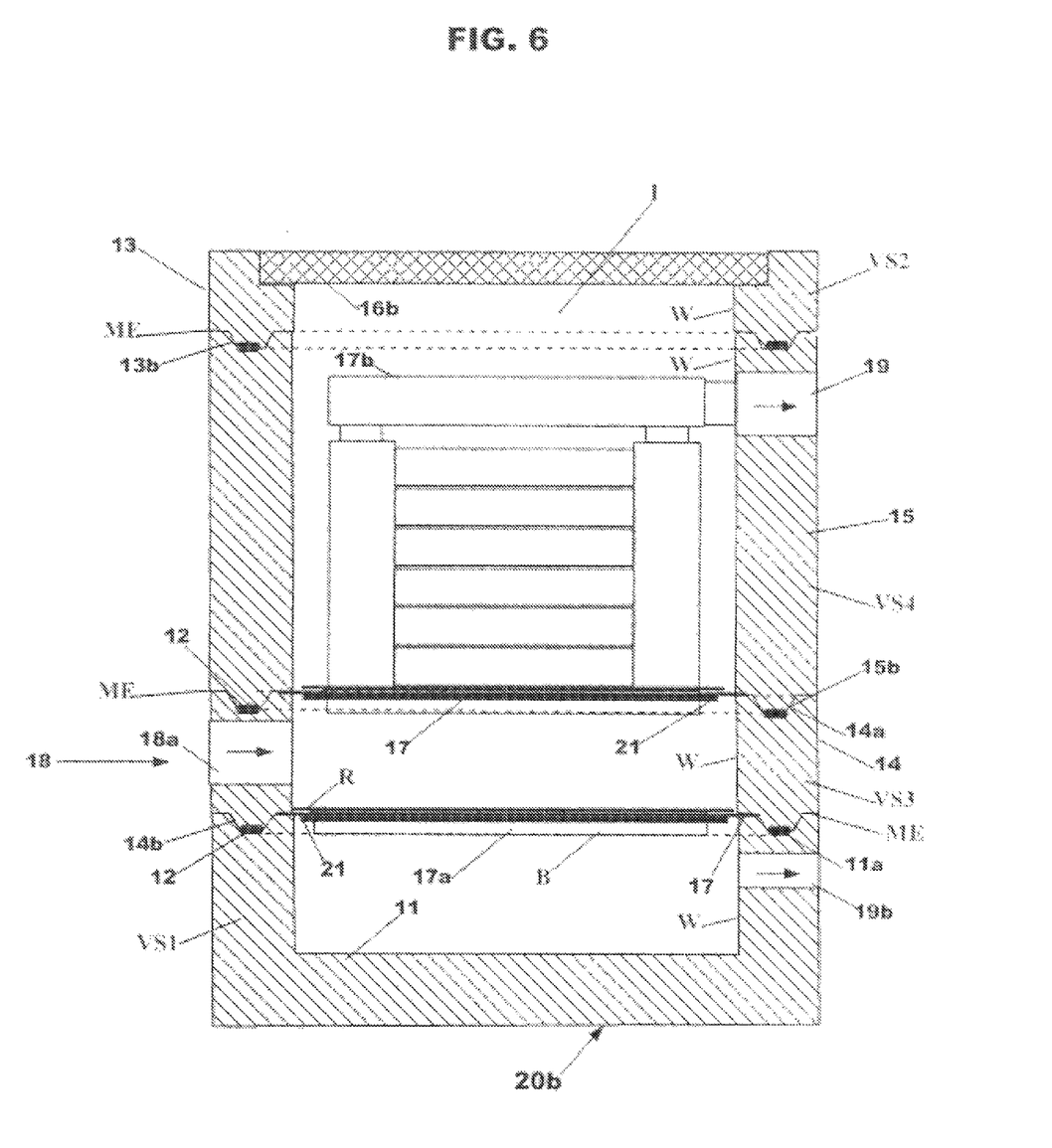
FIG. 6 is a cross-sectional view of yet another embodiment of my vault similar to the embodiment shown in FIG. 5 with an additional vault section and an additional support element securely located between two upper sections of the vault to position additional water treatment equipment within the vault.
Figure 6A:
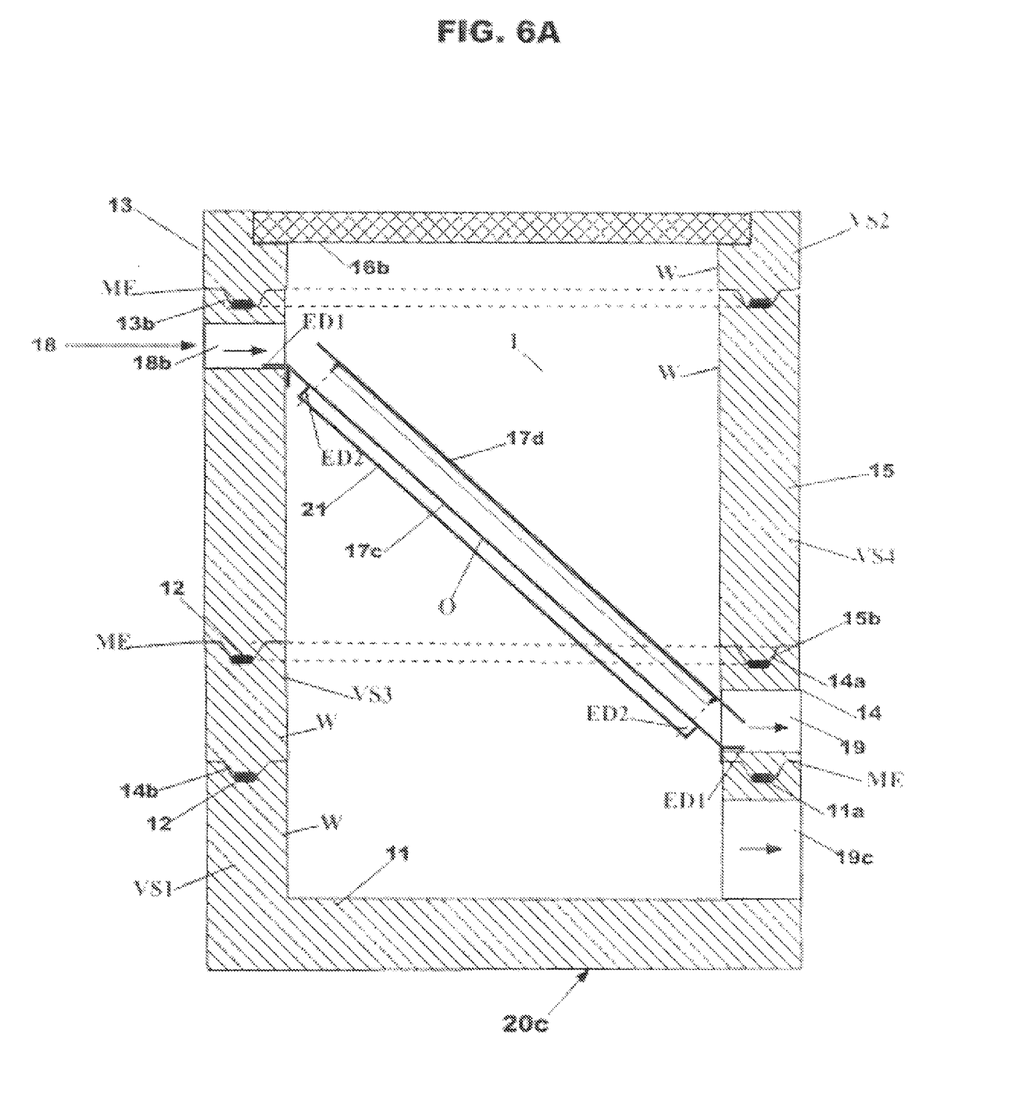
FIG. 6A is a cross-sectional view of yet another embodiment of my vault with the same number of vault sections as in FIG. 6, but with different inlet and exit ports and a different type of support element for positioning a slanted filter element within the vault.

FIGS. 2 through 4 illustrate one embodiment of my vault designated by the numeral 20, FIGS. 4A and 4B illustrates another embodiment of my vault designated by the numeral 30 and using riser sections with different inlets, FIGS. 5 and 5A illustrate yet another embodiment of my vault designated by the numeral 20a, FIG. 6 illustrates still another embodiment of my vault designated by the numeral 20b, and FIG. 6A illustrates another embodiment of my vault designated by the numeral 20c.

All these embodiments depict a drain inlet vault comprising a plurality of pre-cast concrete vault sections VS stacked one upon the other to form the vault. One suitable lightweight concrete is produced by Substiwood, Inc. of Milwaukee, Wis. and disclosed in U.S. Pat. Nos. 6,976,345 and 6,911,076. Each vault section VS has essentially the same cross-sectional configuration and at least one perimeter mating edge ME that upon stacking the vault sections VS one on top of the other the mating edges of adjacent vault sections engage. There is a sealant 12 along the mating edges ME, and at least one open structure, prefabricated support element 17 for water treatment equipment and/or components thereof. The support element 17, which may be fabricated from stainless steel, is supported between assembled adjacent vault sections VS. It may be in the form of a frame structure with an enlarged central opening O having a thin planar outer edge ED1 (FIG.

4) and a thin planar inner edge ED2 extending inward into an interior I of the vault. At least a portion of the outer edge ED1 is positioned between the mating edges ME of the assembled adjacent vault sections VS in a manner that avoids interfering with the function of the sealant 12 along the mating edges. At least a portion of the inner edge ED2 extends inward into an interior I of the vault and forms a ledge L. This ledge L is sufficiently rigid to provide support for, and hold it in place within my vault, the water treatment equipment, or a component thereof. The mating edges ME may comprise a male member along the perimeter edge of one adjacent vault section VS and a female member along the perimeter edge of the other adjacent vault section.

The vault sections have walls W of substantially uniform predetermined thickness and substantially all the vault walls W are of substantially the same thickness, for example, substantially from 4 to 6 inches with internal reinforcing framing, such as steel rods, (not shown) when needed for specific load-bearing applications. The support element 17 may have essentially the same cross-section configuration as the vault sections and an outside perimeter P1 having dimensions greater than the dimensions of the perimeter of the interior I of the vault and an inside perimeter P2 that is less than the dimensions of the perimeter of the interior I. The substantially planar structure between the outside and inside perimeters P1 and P2 provides a ledge L that has a minimal thickness, for example, substantially from 0.05 to 0.07 inch. The sealant 12 is pressed tightly into the female groove portion of the mating edges ME prior to stacking of the vault sections VS.

As depicted in FIG. 5A, vertically stacking of the vault sections VS forms a seal 12a that prevents leakage between the stacked together vault sections while producing a small gap G between the mating edges ME and inward of the seal. This gap G and seal 12a are offset vertically with respect to each other. The outer edge ED1 forming the perimeter P1 is positioned so that it occupies space within the gap G formed along an interior surface of the vault 20 that would otherwise be filled with extruded sealant 12. The support element 17 has predetermined width and thickness dimensions to fit snug within the gap G to avoid interfering with the seal 12a. The inner edge ED2 forming the perimeter P2 extends inward into an interior I of the vault and defines an open area A1 (FIG. 4) that is slightly less than the cross-sectional area A2 of the interior I. The portion of the inner edge ED2 forming the ledge L has sufficient rigidity to provide support for water treatment equipment or components thereof, for example, a filter 17a. A rim R of the filter 17a rests on the ledge L and the body B of this filter fits into the opening O in the support element 17.

FIG. 1

Figure 1:
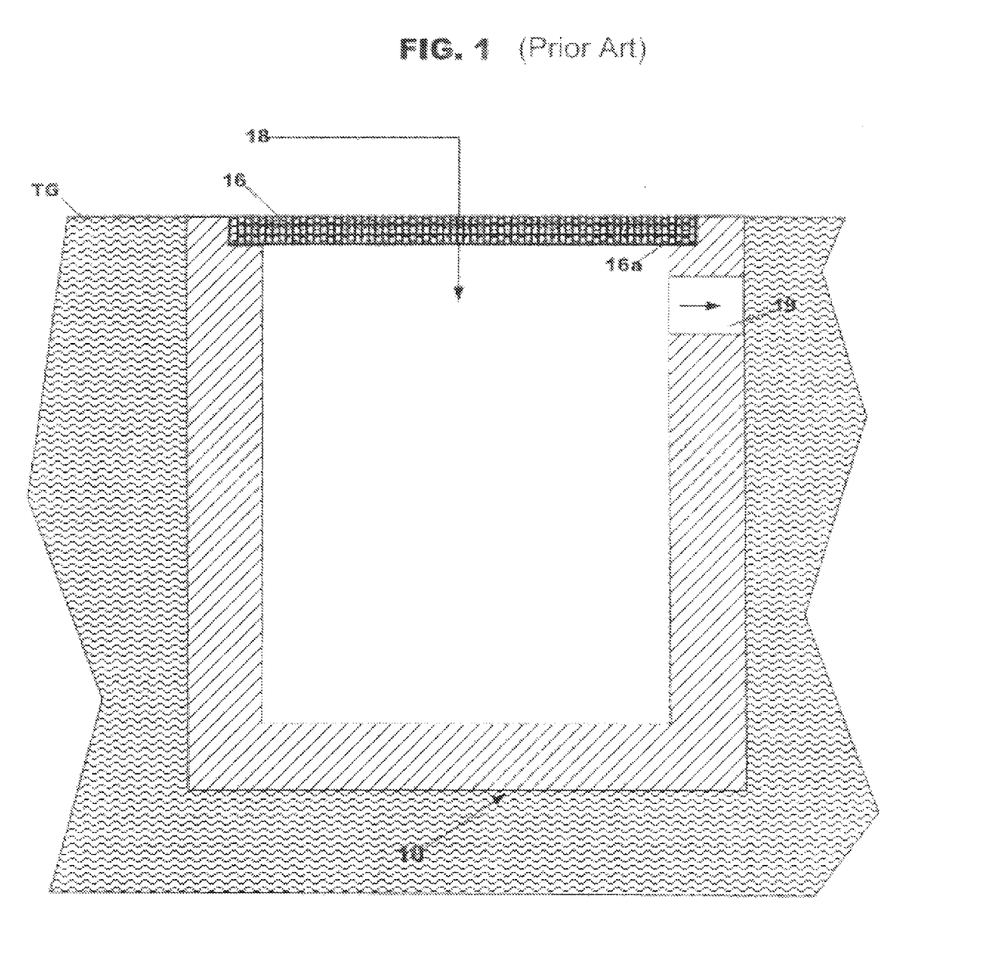
FIG. 1 is a cross-sectional view of a conventional prior art top entry, high-side-exit concrete drain inlet vault of a type in which storm water filters are commonly used, the vault installed in ground.

FIG. 1 discloses a conventional prior art top-entry, high-side-exit, concrete drain inlet vault 10 of a type useful for storm water treatment. This type of drain inlet vault 10 typically, but not exclusively, may be a unitary, concrete rectangular shaped box with an open top-entry grate cover 16 supported by cover support frame 16a which together allow free inlet flow of storm water 18 from the surrounding water shed surface to fill the drain inlet vault 10 until water reaches the exit port 19 and discharges. Because of their size, they are constructed on site, or if cast offsite, can only be economically delivered to sites within a nominal fixed radius distance of the production facility with difficulty. The filtration or other water treatment equipment is installed within such drain inlet vaults 10 to treat the water prior to discharge.

FIGS. 2 through 6

FIG. 2 depicts one embodiment of my drain inlet vault designated by the numeral 20 having essentially of the same overall dimensions and configuration as the vault 10, but comprising an assembly of a plurality of pre-cast vault sections VS at the site. For example, three separate pre-cast vault sections 11, 13 and 14 with tongue-in-groove joints comprising grooves 11a and 14a, and tongues 13b and 14b (FIG. 3), which together enable precise vertical alignment of vault sections 11, 13, 14 and provide for placement of a leakage-preventing industry standard high grade butyl, ASTM C990, sealant tape 12 in grooves 11a and 14a prior to assembly of vault 20. Exit port 19 can be configured as single or multiple round, square or rectangular ports as needed to enable discharge to be as close as possible to the top of vault 20 to facilitate gravity flow on sites with little or no elevation gradient. Exit port(s) 19 can be pre-positioned within or between any pre-cast vault sections to enable flow at any useful elevation between series, or parallel, connected vaults.

FIG. 4 illustrates that both the water treatment equipment itself and the installation thereof is greatly simplified using my vault and method. The drain inlet vault 20 is assembled from the three separately pre-cast vault sections, base section 11, cap section 13 and riser section 14, which are positioned as depicted in FIG. 3 as being finally assembled with joint tongues 13b and 14b aligned in readiness to be inserted into joint grooves 11a and 14a containing the leakage-preventing sealant tape 12. Because of the predetermined, 34 essentially identical cross-sectional configurations of the vault sections VS, these modular sections are able to be stacked one vault section upon another in concentric alignment along a longitudinal centerline CL of the vault. A support element 17 is positioned between vault section 11 and vault section 14 to provide support for a component (filter 17a for example) of water treatment equipment 17a to be removably positioned thereon as shown in FIG. 4. The vault sections VS are lowered one by one into a prepared excavated hole with the sealant tape 12 and support elements 17 in place prior to placing one vault on top of a lower vault section. An additional exit port 19a is added to vault section 11 to enable discharge of filtered water from below support element 17.

The support element 17 is a horizontally oriented frame structure having its inside edge ED2 extending at least partially into the interior I of the vault 20. The leakage-preventing sealant tape 12 is positioned in its joint groove 11a ready for the support element 17 to be positioned on top of the lower vault section 11 where it will be captured and held securely in place when the vault section 14 is placed on top of it, thus pre-positioning support element 17 to provide support for a component of water treatment equipment 17a or 17b, etc., to be positioned thereon. Leakage of water through the interstitial vault joint space(s) containing the support element 17 is prevented by intimate contact between the outer surfaces of the support element, the lower external surface of the upper vault section and the upper external surface of the lower vault section and, additionally, by the vertical offset positioning of sealant tape 12 on the bottom surface of the lower joint cavity.

The support element 17 is horizontally positioned between two vertical vault sections VS, with the perimeter edge ED 1 penetrating a pre-determined distance, for example, not to exceed approximately 1 inch, into the interstitial space or gap G between one lower and one upper section of the vault. The support element 17 may include integral positioning elements (not shown) to assist in properly locating the support element on the top surface of a lower vault section so as to prevent excessive horizontal projection into the joint cavity space. This enables the support element 17 to be located by positioning between the profile configuration of the upper and lower portions of a vault joint, such as a tongue-in-groove type joint between vault sections, and be secured in place by the mass of the upper vault section when lowered into place from above. Each prefabricated support element 17 may have one or more openings O enabling proper positioning of any planned water treatment equipment, passage of appropriate liquid volumes through the support element and be strong enough to support planned loading, including personnel entering the vault for periodic inspection and or cleaning. In the embodiments depicted only one, rectangular central opening O is shown in FIGS. 4 and 5A. Along the perimeter P2 adjacent the opening O is a lip 21 (FIG. 5A) that is substantially at a right angle to the plane of the support element 17. This lip 21, which may be continuous and formed into a rectangular, increases the stiffness and rigidity of the ledge L.

As shown in FIG. 4A, another embodiment of my vault includes a receiver section 30 that directs inflow through an inlet port 18b into a riser section 14 of the treatment vault 20c shown in FIG. 6A. The receiver section 30 has both upper component 11a and lower component 11b for tongue-in-groove joints, enabling integration with base sections 11, riser sections 14 and/or cap sections 13. A grated top 16 and one or more rectangular inlet port(s) 18a receive storm water runoff from the watershed surface and/or underground pipe while rectangular exit port(s) 19 provide for controlled flow into a treatment vault 20c. The receiver section 30 can be set at any elevation at, above or below grade to accommodate the gravity flow demands of the treatment system vault(s) 20c. FIG. 4B depicts the receiver section 30 of FIG. 4A with round inlet port(s) 18a replacing the rectangular port(s) of FIG. 4A.

As FIG. 5 shows, my vault 20a modifies the vault 20 by replacing the grated top 16 with a solid top 16a and providing for storm water entry via a side inlet port(s) 18a in vault section VS2 while drain-down water exits via a lower VS1 including an exit port 19a. In this embodiment, a filter element 17a is shown positioned on support element 17.

As FIG. 6 shows, my vault 20b modifies the vault 20a by adding riser section 15 and an additional prefabricated support element 17 installed between riser sections 14 and 15 to support an alternative unit of water treatment equipment 17b, which receives influent water rising through the upper support element 17, passing through the porous walls of unit 17b and discharging via exit port 19. The overall depth of each individual pre-cast section 11, 13, 14 and/or 15 can be adjusted to enable the most useful elevation for placement of support element 17 to support filters 17a or 17b, etc.

As FIG. 6A shows, my vault 20c modifies the vault 20b by relocating and replacing inlet port 18a with inlet port 18b and relocating exit port 19 to accommodate the hydraulic gravity flow pathway for an alternative prefabricated support element 17c installed between inlet port 18b and exit port 19 to provide support for an alternative unit of water treatment equipment 17d to be removably positioned thereon. Raw influent comprising water and entrained solids cascades over and down the upper surface of unit 17d separating the vast majority of entrained solids and discharging those solids, with a very small fraction of the influent water, via exit port 19 while the vast bulk of the entrained water passes through unit 17d and discharges via exit port 19c. These unique units 17d may be comprised of a Coanda tilted wire wedge wire screen as described in U.S. Pat. Nos. 6,705,049; 6,953,529; 7,258,785; and 7,300,590.

Summary

Drain inlet vault sections VS are assembled on site into a completed vault of essentially any shape or size. The outer horizontal edge ED1 of the prefabricated support element 17 is positioned horizontally during assembly into a space or gap G between two adjacent vault sections VS, thus locating within the interior I of the vault internal support structure needed later for installation of a filter or other water treatment equipment. The support element 17 becomes an integral part of the assembled vault at the appropriate elevations within the interior I of the vault. Such drain inlet vault sections VS are small and modular and they can be manufactured using lightweight raw materials. This enables palletized shipment of such pre-cast vault sections complete with any necessary or desirable additional parts such as the support elements, filters, and any other components of the water treatment equipment.

SCOPE OF THE INVENTION

The above presents a description of the best mode I contemplate of carrying out my vault and method of assembly and of the manner and process of making and using, in such full, clear, concise, and exact terms as to enable any person skilled in the art to make and use my vault and method of assembly. My vault and method of assembly are, however, susceptible to modifications and alternate constructions from the illustrative embodiments discussed above which are fully equivalent. Consequently, it is not the intention to limit my vault and method of assembly to the particular embodiments disclosed. On the contrary, my intention is to cover all modifications and alternate constructions coming within the spirit and scope of my vault and method of assembly as generally expressed by the following claims, which particularly point out and distinctly claim the subject matter of my invention:

The invention claimed is:

1. A drain inlet vault comprising
a plurality of pre-cast concrete vault sections vertically stacked one upon the other to form the vault,
each said vault section having essentially the same cross-sectional configuration and at least one mating edge that upon stacking the vault sections one on top of the other the mating edges of adjacent vault sections engage,
a sealant along the mating edges, and
at least one centrally open structure support element for water treatment equipment,
said support element being supported between assembled adjacent vault sections and including a thin planar outer edge portion positioned between the mating edges of the assembled adjacent vault sections that avoids interfering with the function of the sealant along the mating edges and at least a portion of an inner edge extending inward into an interior of the vault, said portion of an inner edge being sufficiently rigid to provide support for water treatment equipment, or components thereof,
said open structure support element being a frame that has essentially the same cross-sectional configuration as the vault sections and an outside perimeter that is greater than the cross-sectional dimensions of the interior of the vault.

2. The drain inlet vault of claim 1 where the mating edges comprises a male member along the mating edge of one adjacent vault section and a female member along the mating edge of the other adjacent vault section.

3. A drain inlet vault comprising
a plurality of preformed vault sections stacked one upon the other to form the vault,
each said vault section having (a) essentially the same cross-sectional configuration as the other vault sections, (b) walls of substantially uniform predetermined thickness and substantially all the vault walls being of substantially the same thickness, and (c) at least one perimeter edge that upon stacking the vault sections one on top of the other the perimeter edges of adjacent vault sections engage, a sealant along the perimeter edges that is pressed tightly between the perimeter edges upon stacking of the vault sections to form a seal that prevents leakage between the stacked together vault sections and provides a small gap between the perimeter edges and inward of the seal, said gap and seal being offset with respect to each other, and at least one support element for water treatment equipment or components thereof, said support element including a outer edge portion and an inner edge portion, said outer edge portion being inserted into the gap and having predetermined dimensions to fit within the gap to avoid interfering with the seal and the inner edge extends inward into an interior of the vault and defines an open area slightly less than the cross-sectional area of said interior, said inner edge portion being sufficiently rigid to provide support for water treatment equipment or components thereof, said open structure support element being a frame that has essentially the same cross-sectional configuration as the vault sections and an outside perimeter that is greater than the cross-sectional dimensions of the interior of the vault.

4. The drain inlet vault of claim 3 where the perimeter edges comprises a male member in the form of a tongue along the perimeter edge of one adjacent vault section and a female member in the form of a groove along the mating edge of the other adjacent vault section.

5. A drain inlet vault comprising a plurality of vault sections vertically stacked together in substantial registration to form the vault, each said vault section having a predetermined configuration to enable stacking one vault section upon another in concentric alignment along a longitudinal centerline of the vault and each vault section having at least one perimeter edge that upon stacking the vault sections said edges of adjacent vault sections abut each other, an upper most stacked vault section having an open top enabling water treatment equipment or components thereof to be inserted into an interior of the vault formed upon stacking of the vault section through the open top of said upper most stacked vault section, a sealant between the perimeter edges of adjacent stacked together vault sections that forms a seal, and at least one support element for water treatment equipment or components thereof positioned between stacked together vault sections and including a first portion positioned between the mating edges of the assembled adjacent vault sections that avoids interfering with the function of the sealant along the mating edges and a second portion extending inward into the interior that provides support for water treatment equipment, or components thereof.

6. The drain inlet vault of claim 5 where perimeter edges are mating edges comprising a male member along one adjacent vault section and a female member along other adjacent vault section.

7. The drain inlet vault of claim 6 where the male and female members engage to form a narrow gap inward of the seal having an open mouth along an interior wall surface enclosing the interior of the vault, and the portion of the support element adapted to hold water treatment equipment or components thereof has a thin planar outer edge that fits into the open mouth snug within the gap and an inner planar edge that extends slightly outward from the interior wall surface a distance that is substantially from 0.375 to 1.5 inch.

8. The drain inlet vault of claim 5 where the weight of individual sections do not exceed approximately 2500 pounds.

* * * * *